United States Patent
Saito et al.

(10) Patent No.: US 9,813,885 B2
(45) Date of Patent: *Nov. 7, 2017

(54) PERSONAL SECURITY SYSTEM

(71) Applicant: Rave Wireless, Inc., Framingham, MA (US)

(72) Inventors: Ghen Saito, Maplewood, NJ (US); Rodger Desai, Piscataway, NJ (US); Raju Rishi, Manalapan, NJ (US)

(73) Assignee: Rave Wireless, Inc., Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/332,067

(22) Filed: Oct. 24, 2016

(65) Prior Publication Data

US 2017/0142568 A1    May 18, 2017

Related U.S. Application Data

(63) Continuation of application No. 15/054,544, filed on Feb. 26, 2016, now Pat. No. 9,503,876, which is a continuation of application No. 14/748,721, filed on Jun. 24, 2015, now Pat. No. 9,277,389, which is a continuation of application No. 13/440,319, filed on
(Continued)

(51) Int. Cl.
| | |
|---|---|
| *H04W 4/22* | (2009.01) |
| *G08B 25/00* | (2006.01) |
| *G08B 25/10* | (2006.01) |
| *G08B 25/01* | (2006.01) |
| *H04M 1/725* | (2006.01) |
| *H04W 4/02* | (2009.01) |

(52) U.S. Cl.
CPC ............ *H04W 4/22* (2013.01); *G08B 25/009* (2013.01); *G08B 25/016* (2013.01); *G08B 25/10* (2013.01); *H04M 1/72519* (2013.01); *H04W 4/02* (2013.01)

(58) Field of Classification Search
CPC ........ H04W 4/22; H04W 4/02; G08B 25/016; G08B 25/009; G08B 25/10; H04M 1/72519

See application file for complete search history.

(56) References Cited

U.S. PATENT DOCUMENTS

| | | |
|---|---|---|
| 4,643,462 A | 2/1987 | Wallace |
| 5,710,803 A | 1/1998 | Kowal et al. |
| (Continued) | | |

OTHER PUBLICATIONS

*International Search Report* (PCT/US07/64273) dated Oct. 10, 2007; 2 pages.

*Primary Examiner* — Joseph Dean, Jr.
(74) *Attorney, Agent, or Firm* — Occhiuti & Rohlicek LLP

(57) ABSTRACT

A method for providing assistance to each of a plurality of users, each having been enrolled as a member of a community includes receiving, at a server, communications from corresponding mobile devices, each of which is associated with a user who has enrolled as a member in a first community. These emergency communications were initiated by activation of respective personal security buttons on the mobile devices, and provide information about respective security conditions. In response to the communications, the server alerts corresponding first and second security services that are appropriate responding to the respective security conditions.

18 Claims, 2 Drawing Sheets

Related U.S. Application Data

Apr. 5, 2012, now Pat. No. 9,071,643, which is a continuation of application No. 11/687,818, filed on Mar. 19, 2007, now abandoned.

(60) Provisional application No. 60/784,276, filed on Mar. 20, 2006.

(56) References Cited

U.S. PATENT DOCUMENTS

| | | | |
|---|---|---|---|
| 5,787,429 A | 7/1998 | Nikolin | |
| 5,805,670 A | 9/1998 | Pons et al. | |
| 5,808,564 A | 9/1998 | Simms et al. | |
| 6,353,398 B1 | 3/2002 | Amin et al. | |
| 6,480,725 B2 | 11/2002 | Cassidy et al. | |
| 6,560,456 B1 | 5/2003 | Lohtia et al. | |
| 6,600,812 B1 | 7/2003 | Gentillin et al. | |
| 6,643,355 B1 | 11/2003 | Tsumpes | |
| 6,661,340 B1 | 12/2003 | Saylor et al. | |
| 6,696,956 B1 | 2/2004 | Uchida et al. | |
| 6,973,166 B1 | 12/2005 | Tsumpes | |
| 7,026,928 B1 | 4/2006 | Lane | |
| 7,038,590 B2 | 5/2006 | Hoffman et al. | |
| 7,046,140 B2 | 5/2006 | Adamczyk et al. | |
| 7,068,189 B2 | 6/2006 | Brescia | |
| 7,130,389 B1 | 10/2006 | Rodkey et al. | |
| 7,149,533 B2 | 12/2006 | Laird et al. | |
| 7,174,005 B1 | 2/2007 | Rodkey et al. | |
| 7,212,111 B2 | 5/2007 | Tupler et al. | |
| 7,312,712 B1 | 12/2007 | Worrall | |
| 7,362,852 B1 | 4/2008 | Rodkey et al. | |
| 7,770,229 B2 | 8/2010 | Upendran | |
| 2001/0026221 A1 | 10/2001 | Toyota | |
| 2002/0102996 A1 | 8/2002 | Jenkins | |
| 2002/0107927 A1 | 8/2002 | Gallant | |
| 2002/0142813 A1 | 10/2002 | Cassidy et al. | |
| 2003/0041107 A1* | 2/2003 | Blattner | G06Q 10/10 709/204 |
| 2004/0190720 A1 | 9/2004 | Harvey | |
| 2004/0198315 A1 | 10/2004 | Vellotti | |
| 2004/0225681 A1 | 11/2004 | Chaney et al. | |
| 2005/0003797 A1 | 1/2005 | Baldwin | |
| 2005/0009536 A1* | 1/2005 | Ito | G06Q 30/02 455/456.1 |
| 2005/0070247 A1* | 3/2005 | Larson | H04M 11/04 455/404.1 |
| 2005/0170810 A1 | 8/2005 | Choi et al. | |
| 2005/0176402 A1* | 8/2005 | Verloop | H04L 12/2854 455/404.1 |
| 2006/0263022 A1 | 11/2006 | Han | |
| 2007/0072583 A1 | 3/2007 | Barbeau | |
| 2007/0093234 A1 | 4/2007 | Willis et al. | |
| 2007/0149214 A1 | 6/2007 | Walsh et al. | |
| 2007/0190512 A1 | 8/2007 | Meimer et al. | |
| 2007/0288758 A1 | 12/2007 | Weiss | |
| 2008/0188198 A1 | 8/2008 | Patel et al. | |

* cited by examiner

PERSONAL SECURITY SYSTEM

CROSS-REFERENCE TO RELATED APPLICATIONS

Under 35 USC 120, this application is a continuation of U.S. application Ser. No. 15/054,544, filed on Feb. 26, 2016, which is a continuation of U.S. application Ser. No. 14/748, 721, filed on Jun. 24, 2015, and which issued on Mar. 1, 2016 as U.S. Pat. No. 9,277,389, which is a continuation of U.S. application Ser. No. 13/440,319, which was filed on Apr. 5, 2012, and which issued on Jun. 30, 2015 as U.S. Pat. No. 9,071,643, which is a continuation of U.S. application Ser. No. 11/687,818, which was filed on Mar. 19, 2007, and has since been abandoned, which, under 35 USC 119, claimed the benefit of the Mar. 20, 2006 priority date of U.S. Provisional Application No. 60/784,276. The contents of the foregoing applications are incorporated herein by reference.

FIELD OF INVENTION

This invention relates to a system for personal security.

BACKGROUND

Cellular telephone systems today typically provide some sort of location tracking of users, for example, to determine the location of a user that dials an emergency number (e.g., using E911). In some communities of users, such as students on a university campus, use of cellular telephones has become ubiquitous, with users using text messaging and other applications to stay "connected."

SUMMARY

In one aspect, the invention features a method for providing assistance to each of a plurality of users, each of the users having been enrolled as a member of a community. Such a method includes receiving, at a server, a first communication, the first communication having come from a first mobile device associated with a first user from the plurality of users, the first user having been enrolled as a member of a first community, the first communication having been initiated by activation of a personal security button on the first mobile device, the personal security button being configured to issue a notification indicative of a first security condition associated with the first user, receiving, at the server, a second communication, the second communication having come from a second mobile device associated with a second user from the plurality of users, the second user having been enrolled as a member of the first community, the second communication having been initiated by activation of a personal security button on the second mobile device, the personal security button being configured to issue a notification indicative of a second security condition that differs from the first security condition, the second security condition being associated with the second user, in response to the first communication, causing the server to alert a first security service, the first security service being a security service that is appropriate for responding to the first security condition, and in response to the second communication, causing the server to alert a second security service that differs from the first security service, the second security service being a security service that is appropriate for responding to the second security condition.

Some practices of the invention further include displaying, to the first security service, information characterizing the first user, and displaying, to the second security service, information characterizing the second user. Among these practices are those that further include, in response to the first communication, sending a communication from the first security service to the first mobile device, and in response to the second communication, sending a communication from the second security service to the second mobile device.

Other practices include displaying, to the first security service, information characterizing the first user and the first security condition, and displaying, to the second security service, information characterizing the second user and the second security condition.

Also among the practices of the invention are those in which wherein causing the server to alert a first security service includes causing the server to alert campus police, and those in which causing the server to alert a first security service includes causing the server to alert a caregiver of the first user.

Yet other practices of the invention includes those in which: the personal security buttons on the first and second mobile devices are on the respective home screens of the first and second mobile devices; those in which the personal security buttons on the first and second mobile devices are on corresponding dashboards of the first and second mobile device; those in which the personal security buttons are on first and second mobile devices that are both configured to provide one-touch access to respective first and second security services; and any combination of the foregoing.

In some practices of the invention, the first and second security services are different security services, whereas in others, they are the same security service.

Yet other practices of the invention include those in which causing the server to alert a first security service includes causing it to select the first security service based at least in part on the community or causing it to select the first security service based at least in part on the first mobile device's location.

Still other practices include those in which causing the server to alert a first security service includes causing it to select the first security service based at least in part on a last-known location of the first mobile device, and those in which causing the server to alert a first security service includes causing the server to select the first security service based at least in part on a failure to receive a communication from the first mobile device.

Among other practices of the invention includes those in which receiving, at a server, a first communication includes receiving an SMS message.

Other practices of the invention include including causing the server to send a query to a location-based server to identify a location of the first mobile device.

Practices of the invention include those in which the first and second users are personnel on a military base, those in which they are residents of a housing development, those in which they are members of a special-interest group, those in which they are guests of a hotel, and those in which they are inhabitants of a city who have registered for services provided by the server.

Still other practices include those in which causing the server to alert a first security service includes causing the server to select the first security service based at least in part on entry of the mobile phone into a location.

These and other features and advantages of the invention will be apparent from the following detailed description and the accompanying figures in which:

DETAILED DESCRIPTION

Figure 1:
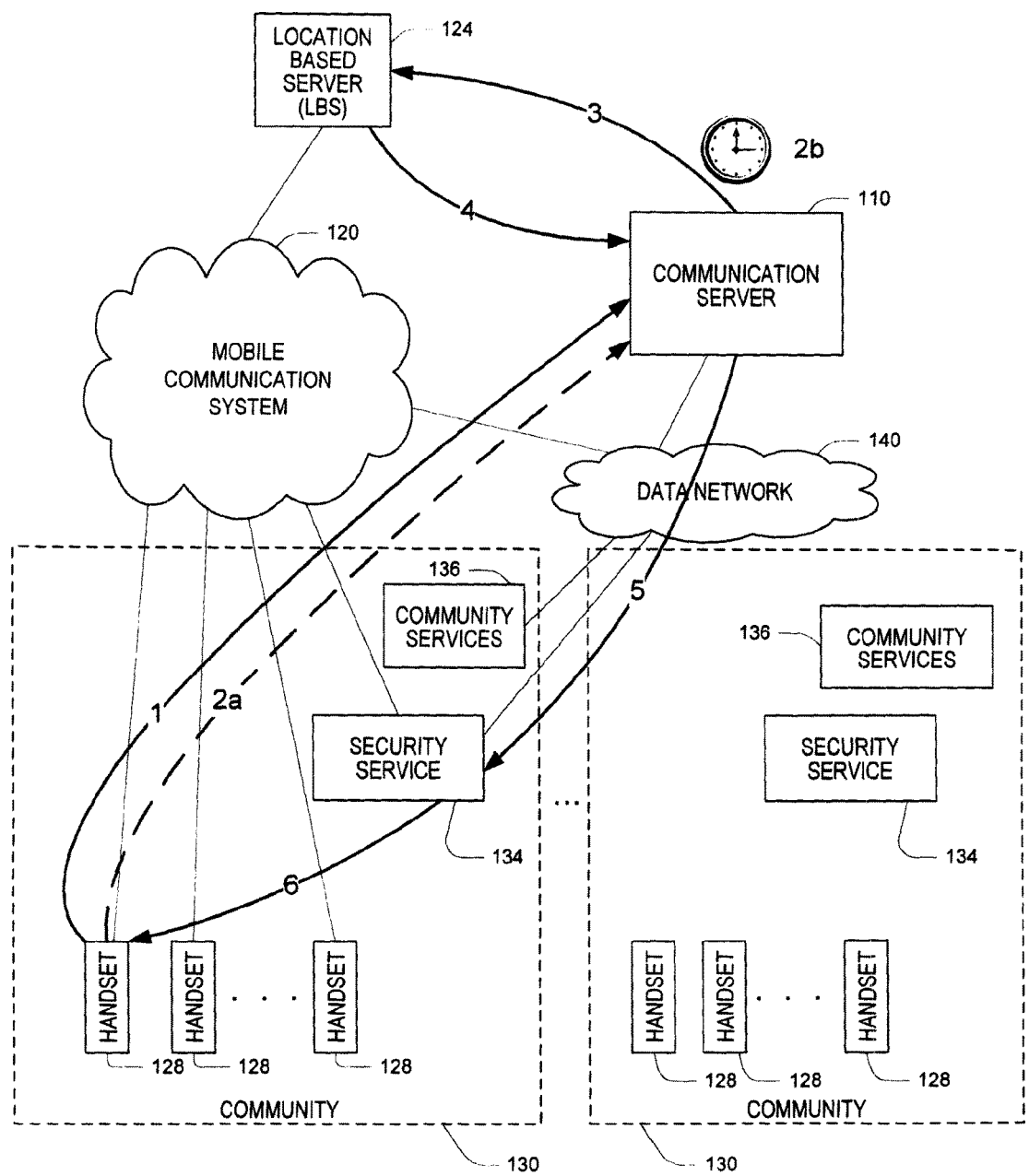
FIG. 1 is a block diagram of a personal security system.

Referring to FIG. 1, a personal security system makes use of personal mobile handsets 128 coupled to a mobile communication system 120. Each handset 128 is associated with a corresponding user of the system. In some examples, the handsets are cellular telephones that are coupled by a mobile telephone system, such as a GSM, CDMA or and iDen based system.

Very generally, the system makes use of a communication server 110, one function of which is to determine when a security situation may exist for one of the users, and to then alert an appropriate security service 134. The security service then determines if there is truly a security situation, for example, by communicating with the user over the handset or investigating in person.

In order to aid the security service, examples of the system make use of various types of location based services. For example, the mobile communication system includes or has associated with it a location based server (LBS) 124, which is able to determine the location of a particular handset 128. The communication server 110 can query the LBS 124 (e.g., as a software based request over the Internet) to determine the location of a particular handset. Different examples of the security system make use of one or more types of location determination approaches. One type of location determination approach uses Global Positioning System (GPS) functionality that is built into the handset, optionally assisted by fixed elements of the mobile communication system 120 in an Assisted GPS (AGPS) approach. Other location determination approaches use signal strength and/or direction information in triangulation approaches based on transmitted or received radio signals from the mobile communication system. Yet other approaches are based on cell identification in a cellular telephone network.

Some examples of the system provide services to multiple different communities 130 of users. Communities can be various associations of users, which may each be served by their own security service 134. An example of a community is a university, with the security service being the campus police service for that university. In such an example, different universities typically have separate campus police services.

Note that in some examples, the communities may not be geographically separated. For example, urban universities may have student communities that are very close to one another (e.g., students of New York University and Columbia University), and the users is such communities may operate in overlapping geographic regions. The system supports configurations in which the users are serviced by the security service for their community, regardless of their actual geographic location.

In some examples, the personal security system supports a personal security button on the handset. Various approaches to configuring the handset to provide such a button are possible, including through provisioning by the operator of the mobile communication system and by downloading software to a configurable device. For example, the "home" or "dashboard" screen of a mobile telephone can provide direct "one touch" access to security services.

When a user activates the personal security button, the handset 128 sends a message to the communication server 110. Various approaches to sending the message are used in different examples of the system. Some examples use a Short Message Service (SMS) provided through the mobile communication system. When the communication server 110 receives the message, it queries the LBS 124 to determine the location of the sending handset. In some examples the LBS already has access to location information for the handset that is maintained by the communication system, while in other examples, it in turn queries the communication system which determines the handset's location. The LBS returns the handset's location to the communication server 110, which then contacts the appropriate security service 134 for the user's community.

Different examples of the system use various approaches to enrollment of users. In some approaches, a web-based approach is used in which a user provides enrollment information to the communication server. Such information includes an identification of the user's community 130, and optionally personal information that might be useful to the security service in an emergency. In other examples, the users enroll through a system operated by the community, and personal information is maintained privately within the community. The community provides the communication server with identifications of the handsets within its community. Example of personal information that may be useful to a security service is a photograph of the user and physical data (e.g., gender, height, weight, hair color, etc.)

Some mobile communication systems 120 require that a user authorize particular parties so that they can access their location information, for example, through the LBS 124. In such systems, as part of the enrollment process the users provide the necessary authorization, which is communicated to the LBS and/or the mobile communication system.

In some examples, the personal security system supports a mode that can be used when a user expects to be at some risk for an upcoming interval of time. For example, a university student may need to cross a campus late at night and feel at risk walking along isolated paths.

Some examples of such a mode use a timer-based approach. Generally, when the user is about to initiate an interval of time during which they may feel at risk, they initiate the timing of an interval by the security system. If the user "checks in" before the expiry of the interval, or alternatively in response to a prompt by the system at the end of the interval, the user is deemed to be safe. On the other hand, if the user does not check in or does not respond to a prompt, or optionally if the handset is not accessible from the communication system 120 during the interval, the security service for that user's community is notified along with the last known location of the handset.

Referring to FIG. 1, a sequence of steps for a previously registered user of the system are described in such an example:

Step 1: The user notifies the communication server 110 that they are about to start an at-risk interval. In different examples, this step is carried out in a variety of ways. For example, the handset may have a browser (e.g., a Wireless Application Protocol, WAP, browser) that accesses an application at the communication server that provides a graphical interface for display on the handset. The graphical interface permits the user to enter the duration of the interval (or alternatively the end time of the interval). In some examples, the user has provided a Personal Identification Number (PIN) to be used to check in—in other examples the user provides a check-in PIN at the start of the interval. In some examples, a software application has already been loaded on the handset, and the application sends data messages to the communication server 110 to initiate the interval. In other examples, communication techniques such as SMS, or voice based (e.g., using speech recognition) or touch-tone (DTMF) based interfaces are user by the user to inform the communication server that the interval is about to start. In some examples, the communication between the handset and the communication server is direct, while in other examples, the communication is mediated by a system operated by the user's community. When the communication server determines that the user has started an interval, it begins a count-down timer that will expire at the end of the interval.

Step 2a: Prior to the end of the interval, the user can communicate with the communication server to check in and terminate the interval. With PIN-based approaches, the user enters their secret PIN, which was recorded as part of a registration procedure, or was provided at the start of the interval. In some examples, the user has the option of entering a special PIN that indicates that they are in danger. For example, suppose an attacker forces a user to terminate the interval, the user can enter a special PIN, such a pre-arranged PIN or the normal PIN with a special suffix (e.g., adding a 1 at the end of the PIN). This can signal the communication server that the user is in danger without alerting the attacker.

Step 2b: If at the end of the interval the user has not yet check in, the communication server can act on the possibility that the user is in danger. In some examples, the server first communicates automatically with the user. For example, the server may interact with an application executing on the handset, send a SMS-based message that needs to be responded to, or may a telephone call requiring voice or text entry of the PIN.

Step 3: If the user has not checked in prior to the expiry of the planned interval, or has not responded to the prompt from the system at the end of the interval in examples that are configured to provide such a prompt, the communication server 110 requests location information for the user's handset.

Step 4: The LBS 124 determines the last known location of the user, optionally with the time the location determination was made. The LBS then send this location information to the communication server 110. The location information may take various forms, such as latitude and longitude.

Step 5: The communication server 110 notifies the security service 134 for the user. In examples in which the communication server 110 serves many communities, the server has been configured with at least information identifying the particular security service to notify (or alternatively, multiple security services may be notified and only the one responsible for that handset acts on the notification). In examples in which the communication server has additional personal information related to the user (e.g., name, photo, etc.) it sends this information along with the notification. In examples in which the security service has access to personal information for that user, it accesses that information in response to the notification.

Figure 2:
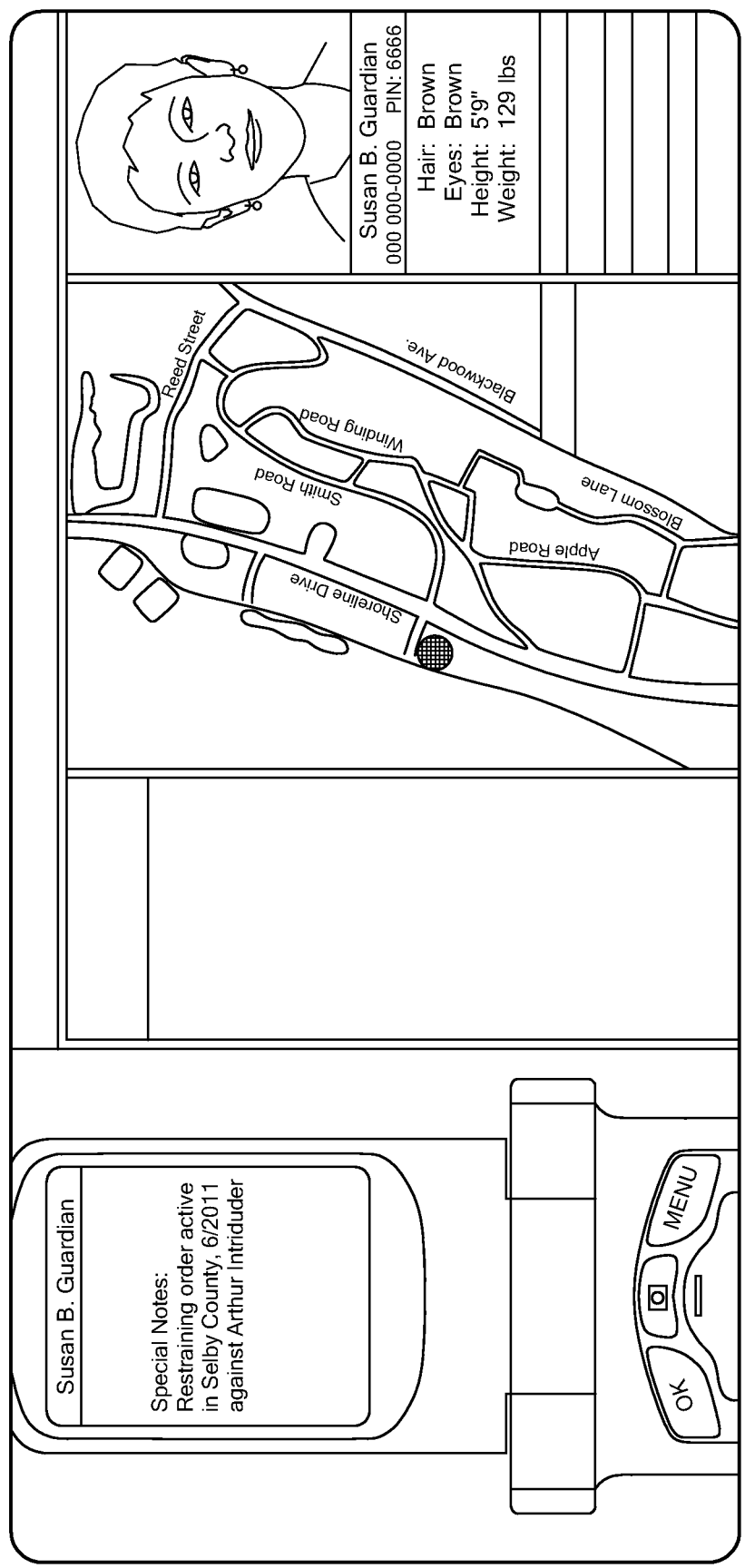
FIG. 2 is a graphical display for security personnel.

In some examples, security personnel, for example at a command station or at a mobile device for personnel on patrol, are provided with a display associated with the user and the current risk. For example, referring to FIG. 2, a graphical display with a map showing the user's location (or last known location), a photograph of the user, as well as text-based personal information are displayed to the security personnel.

Step 6: The security personnel attempt to interact with the user, for example, by calling their handset to establish person-to-person communication, and/or by dispatching personnel to the user's location to provide assistance. When appropriate, the security service may notify other security organizations, such as a local police department, to help handle the incident.

In some examples, when a user initiates an at-risk interval, the communication server may initially inform the security service and provide location information obtained from the LBS on an ongoing basis. The security service can maintain a display, for example showing their locations on a map, of users as they travel. In some examples, users may have the option of permitting or denying such tracking, for example, for privacy reasons. A concentration of users in a particular area may be addressed by dispatching preventive patrols into the area. Also, historical information may be logged, for example, to identify areas and time in which users feel at risk or in which incidents actually occur. Such historical information may used, for example, to improve users' sense of security in those areas, for example though physical improvements (e.g., lighting) or increased patrols.

In some examples, the security period may be defined using other and/or additional criteria than time duration or end time. For example, a user may identify a route (e.g., using a destination building number) and the security period is defined as the time until the user reaches the destination. In such an example, the end of the security period may be defined by the server as a reasonable time needed to reach the destination. In some examples, the communication server may determine that there may be a possible security condition if the user deviates significantly from a path to the declared destination.

In some examples, security periods may be initiated or defined by entities other than the user. For example, a parent may require that a child check in at a particular time (e.g., at midnight) or at a set of prespecified times (e.g., every two hours). In addition or instead of notifying a security service, the parent may be notified if the child fails to check in. That is, the parent may serve the role of the security service. Similarly, an elderly parent may need to check in periodically or else their adult child or other caregiver is notified with information about their location. In some examples, a child may initiate the security period with the parent being notified if they fail to terminate the period or check in when prompted.

In some examples, a security period may be initiated by a passive activity of the user. For example, a system may detect that a user has entered a predefined geographic area (e.g., going off campus, leaving a nursing home) and may have to check in within a certain period of time (e.g., within one hour).

In some examples, the user's community security service is notified regardless of the user's geographic location. For example, a user from a university in California may be visiting New York City yet their security-related notifications are sent back to California. This approach can permit their university security service to provide additional information to local New York police. In other examples, the security service that is notified may depend on the user's geographic location. For example, universities may cooperate and a student visiting another university's campus may result in a notification to the security service of the visited university in addition or instead of the user's home university.

In some examples, one communication server 110 may interact with multiple mobile communication systems. For example, users in a single community 130 or in different communities 130 may be served by different mobile telephone carriers.

In some version of the system, additional community services 136 may take advantage of the capabilities of the communication server. For example in a university situation, a community service may include an academic group that provides class-related notifications (e.g., class cancellation, in-class surveys, etc.). Another community service may include access to transportation information, such a campus bus routes, schedules, and expected arrival time information. Other examples include broadcasting of campus-wide alerts, which may be security related.

In the description above, in some examples of the system a university student community is provided as an example of users served by the system. Other examples of communities may be served by examples of the system. For example, personnel on a military base, a special interest group, a church group, residents of a housing development, inhabitants of cities, towns, hotel guests, etc. can each form a community served by an example of a personal security system.

In some examples, capabilities described are implemented in software, which may be stored on computer readable media or embodied on signals propagating through communication media (e.g., over wired or wireless networks). The software may include instructions, such as machine instructions, programming language or interpreter statements, instructions for virtual machines (e.g., Java), or other forms of instructions. The software may be distributed, for example, with some components execution on the handsets and other components executing at fixed servers.

It is to be understood that the foregoing description is intended to illustrate and not to limit the scope of the invention, which is defined by the scope of the appended claims. Other embodiments are within the scope of the following claims.

Having described the invention, and a preferred embodiment thereof, what is claim as new, and secured by Letters Patent is:

1. A method for providing assistance to each of a plurality of users, said plurality of users comprising first and second distressed users, said method comprising receiving, at a server, a first communication from a first mobile device that is associated with said first distressed user, said first distressed user having been enrolled as a member of a first community, said first mobile device being located at a first location, said first location being associated with a first designated party for receiving emergency calls originating from said first location, receiving, at a server, a second communication from a second mobile device associated with said second distressed user, said second distressed user having been enrolled as a member of a second community, said second mobile device being at said first location, said second community having a second designated party for receiving emergency calls associated with said second community, said second designated party being different from said first designated party, in response to said first communication, causing said server to initiate communication with said first designated party, wherein said first designated party is designated to receive emergency communications from members of said first community, in response to said second communication, causing said server to initiate communication with said first designated party, displaying, to said first designated party, information characterizing said first distressed user, displaying, to said first designated party, information characterizing said second distressed user, displaying, to said second designated party, information characterizing said second distressed user, in response to said first communication, sending a communication from said first designated party to said first mobile device, and in response to said second communication, sending a communication from said first designated party to said second mobile device.

2. The method of claim 1 wherein said first community is an institution having a campus, wherein said first location is within said campus, and wherein said second location is outside said campus.

3. The method of claim 1 wherein said first designated party comprises a member of a campus police department.

4. The method of claim 1, wherein receiving said first communication comprises receiving a communication initiated by actuating a panic button on said first mobile device, wherein said panic button has no function, whether alone or in combination with other interface elements, but to establish communication with said server.

5. The method of claim 1, wherein displaying, to said first designated party, information characterizing said first distressed user occurs upon lapse of a security period defined by said first user, wherein displaying, to said first designated party, information characterizing said second distressed user occurs upon lapse of a security period defined by said second user, and wherein displaying, to said second designated party, information characterizing said second distressed user occurs upon lapse of said security period defined by said second user, wherein said method further comprises receiving, from said first distressed user, a length of said security period defined by said first user and receiving, from said second distressed user, a length of said security period defined by said second user.

6. The method of claim 1, wherein displaying, to said first designated party, information characterizing said first distressed user comprises displaying first vital information, wherein displaying, to said first designated party, information characterizing said second distressed user comprises displaying second vital information, wherein displaying, to said second designated party, information characterizing said second distressed user comprises displaying said second vital information, wherein said first vital information is associated with said first distressed user, and wherein said second vital information is associated with said second user.

7. The method of claim 1, wherein displaying, to said first designated party, information characterizing said first distressed user occurs upon lapse of a security period defined by said first user, wherein displaying, to said first designated party, information characterizing said second distressed user occurs upon lapse of a security period defined by said second user, and wherein displaying, to said second designated party, information characterizing said second distressed user occurs upon lapse of said security period defined by said second user.

8. The method of claim 1, wherein displaying, to said first designated party, information characterizing said first distressed user occurs upon occurrence of an event, wherein displaying, to said first designated party, information characterizing said second distressed user occurs upon occurrence of said event, and wherein displaying, to said second designated party, information characterizing said second distressed user occurs upon occurrence of said event.

9. The method of claim 1, wherein receiving said first communication comprises receiving a communication initiated by actuating an interface element on said first mobile device, wherein said interface element has no function, whether alone or in combination with other interface elements, but to establish communication with said server.

10. The method of claim 1, further comprising transmitting said information characterizing said first distressed user to a police department associated with said first location.

11. The method of claim 1, further comprising providing a graphical user interface on said first mobile device for enabling said first user to prematurely end a security period.

12. The method of claim 1, further comprising providing a graphical user interface on said first mobile device for enabling said first user to specify a length of a security period.

13. The method of claim 1, wherein displaying, to said first designated party, information characterizing said first distressed user comprises displaying first medical information, wherein displaying, to said first designated party, information characterizing said second distressed user comprises displaying second medical information, wherein displaying, to said second designated party, information characterizing said second distressed user comprises displaying said second medical information, wherein said first medical information is associated with said first distressed user, and wherein said second medical information is associated with said second user.

14. The method of claim 1, wherein displaying, to said first designated party, information characterizing said first distressed user occurs upon occurrence of a first event, wherein displaying, to said first designated party, information characterizing said second distressed user occurs upon occurrence of a second event, and wherein displaying, to said second designated party, information characterizing said second distressed user occurs upon occurrence of said second event.

15. The method of claim 1, wherein receiving said first communication comprises receiving a communication initiated by actuating an interface element on said first mobile device.

16. The method of claim 1 further comprising sharing, with a plurality of members of said first community, information indicative of a location of said first mobile device.

17. The method of claim 1 wherein said first community is an institution having a campus, wherein said first location is within said campus and wherein said second location is beyond said campus.

18. The method of claim 1, wherein receiving said first communication comprises receiving a communication initiated by actuating a panic button on said first mobile device.

* * * * *